E. A. GILLINDER.
GLASS MELTING POT.
APPLICATION FILED SEPT. 17, 1915.
1,223,959.
Patented Apr. 24, 1917.
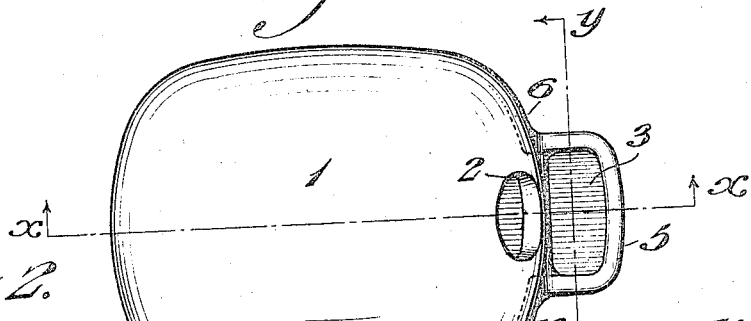
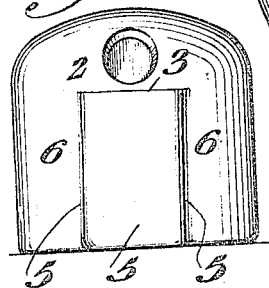
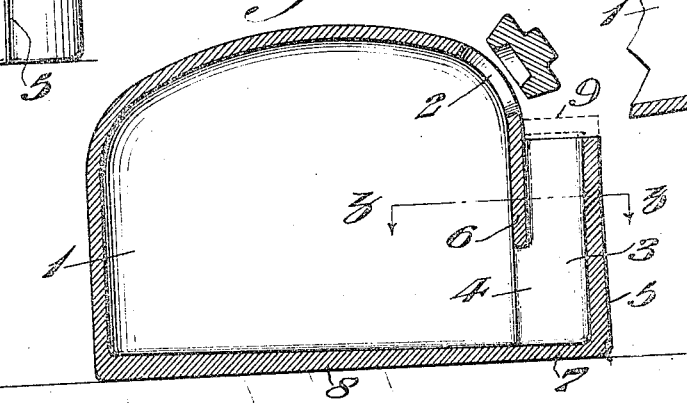
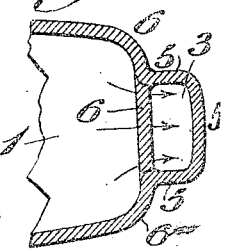
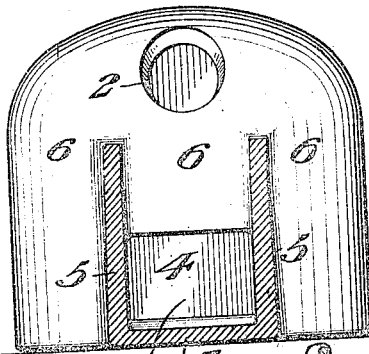
WITNESSES
INVENTOR
Edgar A. Gillinder
BY
Wiederheim + Fairbanks
ATTORNEYS

UNITED STATES PATENT OFFICE.

EDGAR A. GILLINDER, OF PHILADELPHIA, PENNSYLVANIA.

GLASS-MELTING POT.

1,223,959.

Specification of Letters Patent.    Patented Apr. 24, 1917.

Application filed September 17, 1915. Serial No. 51,134.

*To all whom it may concern:*

Be it known that I, EDGAR A. GILLINDER, a citizen of the United States, residing in the city and county of Philadelphia, State of Pennsylvania, have invented a new and useful Glass-Melting Pot, of which the following is a specification.

My invention consists of a glass melting pot provided with an auxiliary chamber in communication with the body of said pot, said chamber being adapted to receive the molten glass from which the latter may be removed or taken out by the glass blowing pipes or tubes, in a more convenient manner than heretofore, and a number of such pipes or tubes may be introduced simultaneously into said chamber, so that a greater amount of work may be accomplished in a given time.

The invention is satisfactorily illustrated in the accompanying drawing, but the important instrumentalities thereof may be varied, as long as they are included in the scope of the claims.

Figure 1 represents a top or plan view of a glass melting pot embodying my invention.

Fig. 2 represents a front view thereof on a reduced scale.

Fig. 3 represents a longitudinal vertical section on the line $x$—$x$ Fig. 1.

Fig. 4 represents a transverse vertical section on the line $y$—$y$ Fig. 1.

Fig. 5 represents a horizontal section of a portion on the line $z$—$z$ Fig. 3.

Similar numerals of reference indicate corresponding parts in the figures.

Referring to the drawings.

1 designates the body of a glass melting pot, the same being provided in its wall with the feed opening or inlet 2 which is adapted to be closed by a suitable plug or cover, these features *per se* being well known in the art.

At the front of said body is the well 3 which is in communication with the interior of said body by means of the passage 4 between said well and body, said well being formed of the vertical front and side wall 5 which joins the front wall 6 of said body and is set out therefrom, and the closed bottom 7 which is forward extension of the bottom 8 of said body 1, said bottom 8 being inclined from rear to front.

It will be noticed that the lower portion of the front wall 6 of the body which is rearward of the front wall of the well 3 is cut away or removed to the bottom 8 of the body 1, forming the passage 4, as referred to.

The top of the well is open, but may be closed by a cover of suitable form, as shown dotted as at 9, see Fig. 3, so as to retain heat within the well during the melting operation in the furnace employed.

It will be seen that the refined molten glass will flow from the body through the passage 4 into the well 3, and so supply the latter, from whence it may be readily taken out by the pipes or tubes dipped into the well from the top thereof, its cover 9 having been removed, it being seen also that ample room is provided for the use of a plurality of pipes or tubes in said well, and said pipes or tubes can be used in upright or perpendicular direction which is more convenient than that heretofore practised by introducing such pipes or tubes in inclined direction into the body 1.

Furthermore, the batch of molten glass in the body will flow positively from the same into the well owing to the inclination of the bottom 8, and so there will be no waste of the glass, as every particle thereof will be directed into the well where it is accessible and removable at its open top.

The walls of the well 3 are at such height in relation to the supply of glass in the body as to prevent overflow of glass at the top of said well, and cause the level of glass in the well to be that of the body, it being evident that the feed inlet 2 being open admits air into the pot, and so the glass from the same is permitted to rise to the proper level in the well, and owing to the passage 4, the portion of the wall above the same acts as a bridge, whereby the refined molten glass in the body flows under said bridge, and so rises in similar condition into the well, whence the glass may be taken out for working, it being evident also that the float-ring heretofore existing in a glass pot, is dispensed with, and the entire interior of the body 1 is unobstructed or clear for occupancy by the batch of glass material, but the refined glass enters the well and rises therein and so glass presents itself at the top to the workman.

Having thus described my invention what I claim as new and desire to secure by Letters Patent, is:—

1. A glass melting pot composed of a body closed at the top and having a discharge passage in its side in the lower portion thereof, and a well on side set-out from the same and having its top open exterior of the adjacent wall of said body and of said top and having a closed bottom and being in communication with the interior of said body at said passage, and a feed inlet in the wall of said body above the open top of said well.

2. A glass melting pot composed of a body closed at the top, a well set-out from a wall of the same and beyond said top, said wall having in its lower portion a passage forming a communicating passage for said well and body, the bottoms of said body and well being integrally continuous of each other, the upper face of said bottoms being inclined from the rear of said body to the front of said set out well.

3. In a glass melting pot, a body having an integral top, a well set out from a wall of the same, said wall having in its lower portion a passage forming a communicating passage for said well and body, the top of said well being directly open from above outside of the adjacent wall of said body having an integral top.

4. A glass melting pot comprising a body closed at the top and said top provided with a feed opening, a well set out from a wall of said body beyond the top, said wall having in its lower portion a passage forming a communication between the body and well, the top of said well being directly open from above outside of the adjacent wall of said body, the bottoms of said body and well being continuous of each other and inclined unbroken throughout from the rear wall of the pot to the outer wall of the well.

EDGAR A. GILLINDER.

Witnesses:
JOHN A. WIEDERSHEIM,
N. BUSSINGER.